(12) United States Patent
Boutet et al.

(10) Patent No.: US 7,982,202 B2
(45) Date of Patent: Jul. 19, 2011

(54) ENHANCED LIGHT DETECTOR FOR COMPUTED RADIOGRAPHY

(75) Inventors: John C. Boutet, Rochester, NY (US); Christopher M. Muir, Rochester, NY (US); Peter A. Newman, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 215 days.

(21) Appl. No.: 12/412,450

(22) Filed: Mar. 27, 2009

(65) Prior Publication Data
US 2010/0243925 A1     Sep. 30, 2010

(51) Int. Cl.
*G03B 42/08* (2006.01)
(52) U.S. Cl. .................. 250/586; 250/584; 250/585
(58) Field of Classification Search .................. 250/586, 250/584, 585
See application file for complete search history.

(56) References Cited

U.S. PATENT DOCUMENTS

| | | | |
|---|---|---|---|
| 4,692,813 A * | 9/1987 | Conrad et al. | 358/406 |
| 5,151,592 A * | 9/1992 | Boutet et al. | 250/228 |
| 5,218,205 A * | 6/1993 | Lange et al. | 250/585 |
| 6,180,955 B1 | 1/2001 | Doggett et al. | 250/586 |
| 6,624,438 B2 | 9/2003 | Koren | 250/584 |
| 6,982,411 B2 | 1/2006 | Thoms | 250/239 |
| 6,987,280 B2 | 1/2006 | Boutet et al. | 250/586 |
| 7,381,980 B2 | 6/2008 | Goldman et al. | 250/584 |

* cited by examiner

*Primary Examiner* — Constantine Hannaher

(57) ABSTRACT

A scanning apparatus for obtaining an image from a phosphor sheet has a cylindrical drum having an inner axis and having an inner surface that is concave with respect to the axis. A light collector is coupled to a transport mechanism that is actuable to translate the light collector along a direction parallel to the axis. The light collector has a beam generator with a light source and a rotatable beam deflector that is actuable to provide a rotating scanning beam. There are first and second cylindrical hoops circumferentially disposed about the axis and spaced apart from each other along the direction of the axis to define a slot aligned with the rotating scanning beam as it scans the phosphor sheet. At least one light detector is disposed to detect light stimulated from the phosphor sheet by the scanning beam.

36 Claims, 16 Drawing Sheets

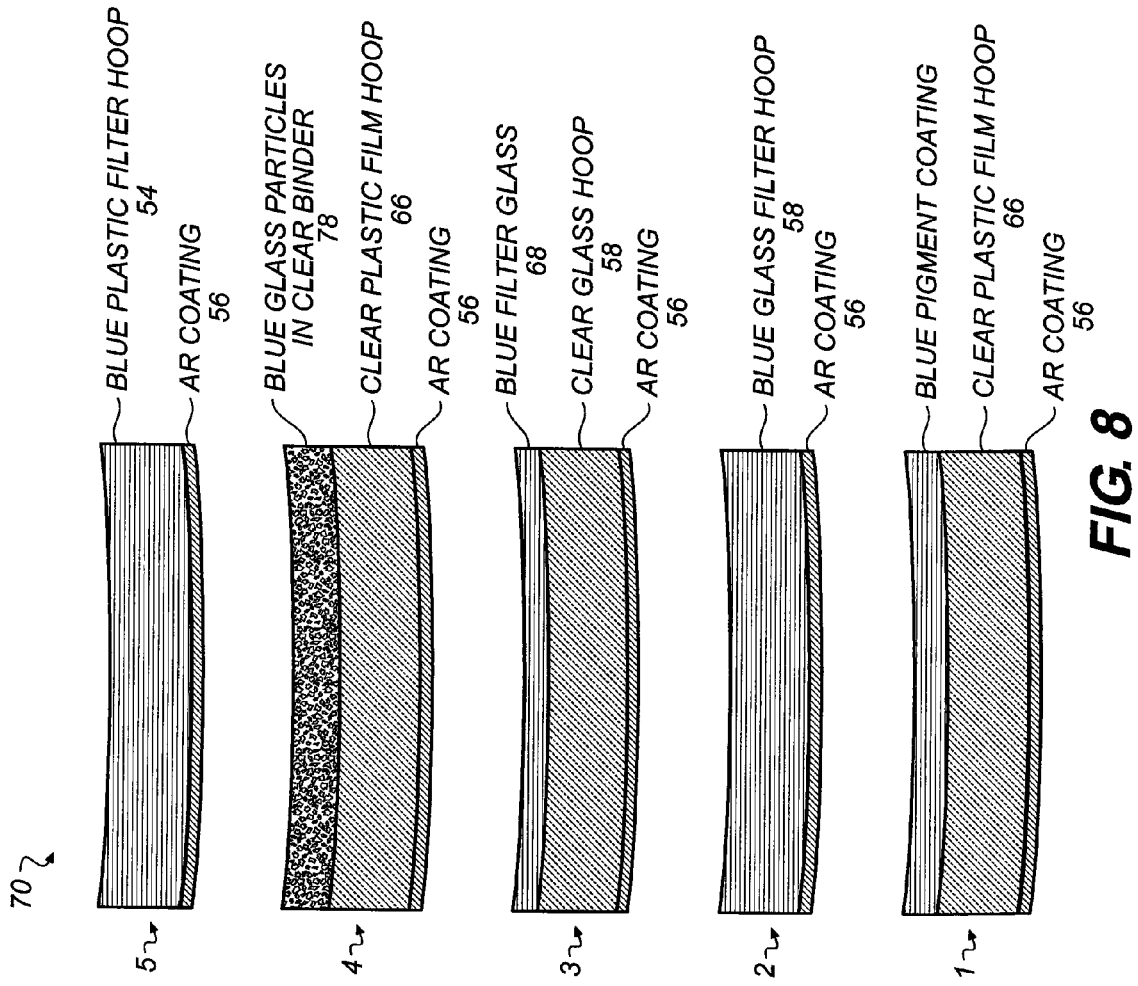

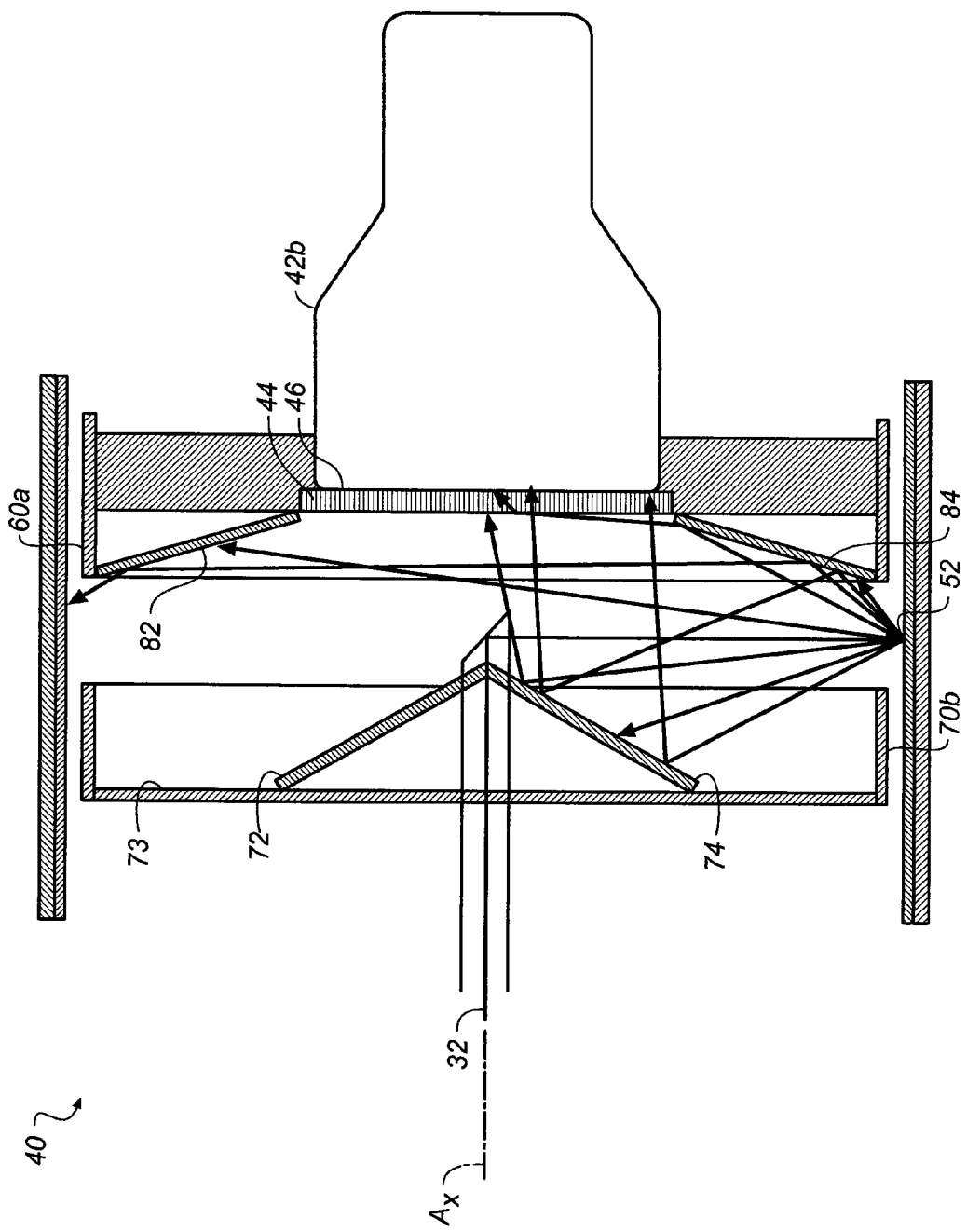

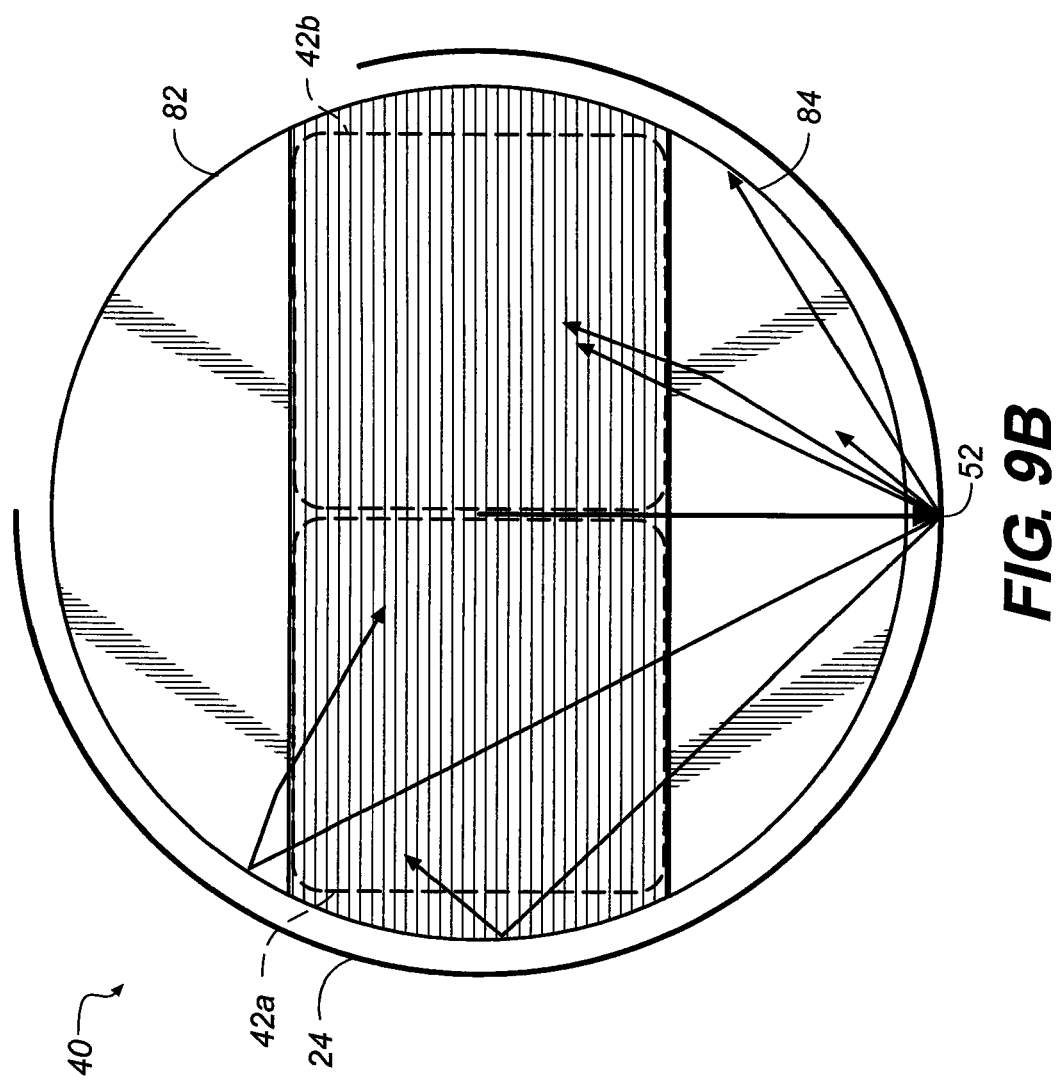

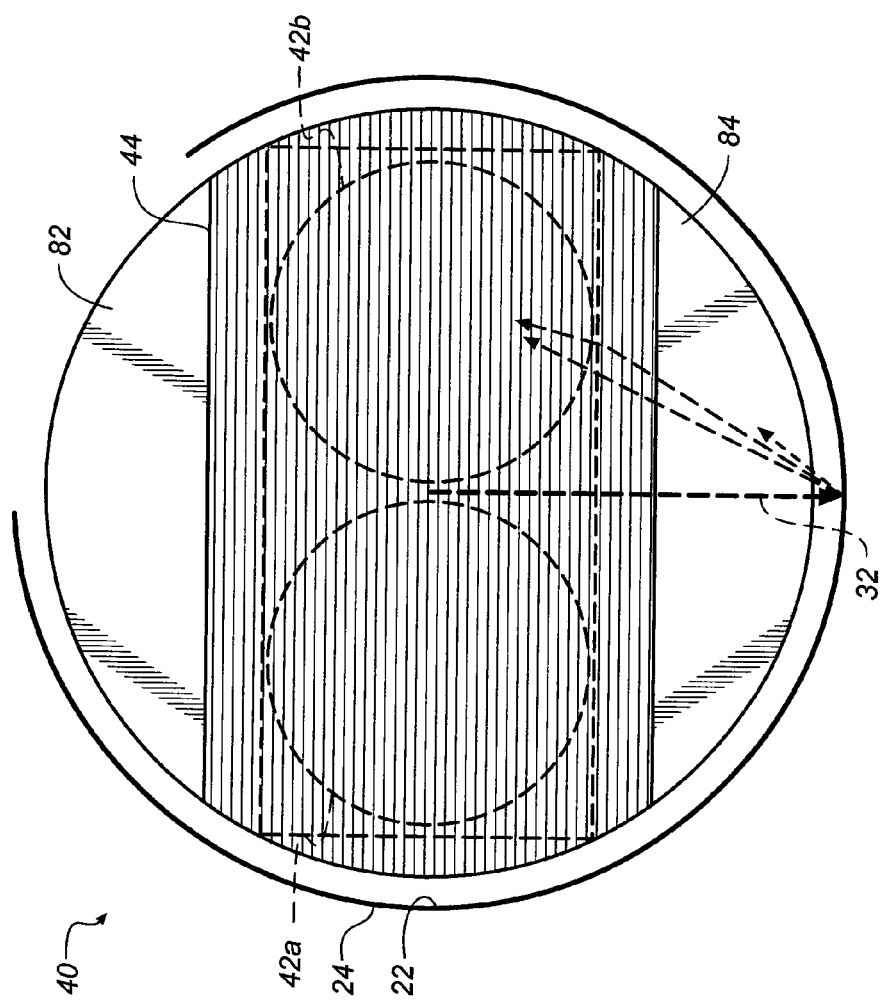

ENHANCED LIGHT DETECTOR FOR COMPUTED RADIOGRAPHY

FIELD OF THE INVENTION

The invention relates generally to computed radiography (CR) apparatus for obtaining an image stored on a photostimulable medium and more particularly relates to an apparatus and method for enhancing detection of the stored image signal and suppressing image flare in a scanning apparatus.

BACKGROUND OF THE INVENTION

In Computed Radiography (CR), a phosphor sheet is exposed to x-ray or other short-wavelength ionizing radiation and stores a latent image that is read out by a scanning device. Within the scanning device, read-out is effected by illuminating the sheet, one spot or pixel (picture element) at a time, with a stimulating beam of a first relatively long-wavelength light, such as with red laser light. When it receives the stimulating beam, the illuminated spot on the phosphor sheet emits radiation at a second, shorter wavelength, typically in the blue region. The amount of radiation that is emitted upon stimulation is proportional to the amount of energy stored as a result of x-ray exposure. An optical collector, including a Photo-Multiplier Tube (PMT) or other type of photodetector device, obtains image content by sensing the relative amount of stimulated light of this second wavelength, one pixel at a time, in a scanning sequence that moves across the surface of the phosphor sheet.

One class of CR equipment employs a flexible phosphor sheet as its storage medium. The scanning apparatus for this type of medium loads the flexible storage sheet with its back against the inner, concave surface of a cylindrical drum. In this type of internal drum scanner, the stimulating laser beam spins radially as it is moved linearly in an axial direction, tracing out a helical scan pattern; a light collector travels along the axis with the spinning beam, recording the stimulated light. This arrangement allows the scanner to be relatively compact and has optical advantages for obtaining the stored image data in a uniform manner across the surface of the flexible phosphor sheet. One exemplary scanner of this type is described in U.S. Pat. No. 6,624,438 entitled "Scanning Apparatus" to Koren.

While conventional CR scanning methods have achieved some level of success, it has proven difficult to improve image quality beyond a certain point. One innate difficulty relates to the relative inefficiency of the phosphor material itself. Due to low efficiency levels, the photomultiplier tube (PMT) or other detector must be very sensitive in order to capture the image signal and is thus highly susceptible to noise. Compromises made to increase the signal strength or sensitivity work counter to the need for keeping noise levels low. Thus, increasing the signal-to-noise ratio appears to be an elusive goal.

The internal drum scanner is designed to eliminate ambient noise from other light sources. However, because of its cylindrical geometry, this type of scanner can be subject to a false signal, termed "flare". Flare results because a significant portion of the stimulating beam reflects from the surface of the phosphor sheet instead of being absorbed. This stray light, traveling inside the drum, can impinge on other portions of the phosphor sheet, inadvertently causing emission from areas other than the stimulated spot or pixel. Flare degrades collection efficiency in two ways: exciting a false signal by premature emission from areas of the surface outside the scanned spot and draining stored energy due to such emission in portions of the phosphor that have not yet been scanned.

Conventional approaches have been applied in attempts to reduce the occurrence and effects of flare. In the scanner described in the Koren '438 disclosure, a filter is provided against the input aperture of the sensing photomultiplier tube. This filter reduces flare by transmitting the second stimulated frequency and absorbing the first stimulation frequency. Other designs provide a narrow slit through which the stimulating beam is directed, reducing the range of angles permitted for reflected stimulating light. However, this type of approach can also restrict the amount of stimulated light that is able to enter the collector from the spot being scanned. As a consequence, providing a suitable slot width generally involves a compromise that tolerates more flare than is desired and achieves less collection efficiency than is desired.

Thus there is a need for an internal drum CR scanner that reduces the likelihood and susceptibility to flare and increases the amount of signal, thereby providing improved signal-to-noise characteristics and higher quality radiographic imaging.

SUMMARY OF THE INVENTION

It is an object of the present invention to advance the diagnostic scanning arts. With this object in mind, the present invention provides a scanning apparatus for obtaining an image from a phosphor sheet comprising: a cylindrical drum having an inner axis and having an inner surface that is concave with respect to the axis; a light collector coupled to a transport mechanism that is actuable to translate the light collector along a direction parallel to the axis, the light collector comprising: (1) a beam generator comprising a light source and a rotatable beam deflector that is actuable to provide a rotating scanning beam; and (2) first and second cylindrical hoops circumferentially disposed about the axis and spaced apart from each other along the direction of the axis to define a slot aligned with the rotating scanning beam as it scans the phosphor sheet; and at least one light detector disposed to detect light stimulated from the phosphor sheet by the scanning beam.

Embodiments of the present invention can provide improved signal-to-noise performance of an internal drum CR scanner over earlier designs.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 8 provides cross-sectional views of a filter hoop in a number of different embodiments.

FIG. 9A is a cross-sectional view of an embodiment of the present invention that employs tilted mirrors for redirecting light into the light detector.

FIG. 9B is a plan view taken along the scanning drum axis and showing the arrangement of detectors and reflective surfaces in the FIG. 9A embodiment.

FIG. 11B is a plan view taken along the scanning drum axis and showing the arrangement of detectors and reflective surfaces in the FIG. 11A embodiment.

DETAILED DESCRIPTION OF THE INVENTION

Figure 1A:
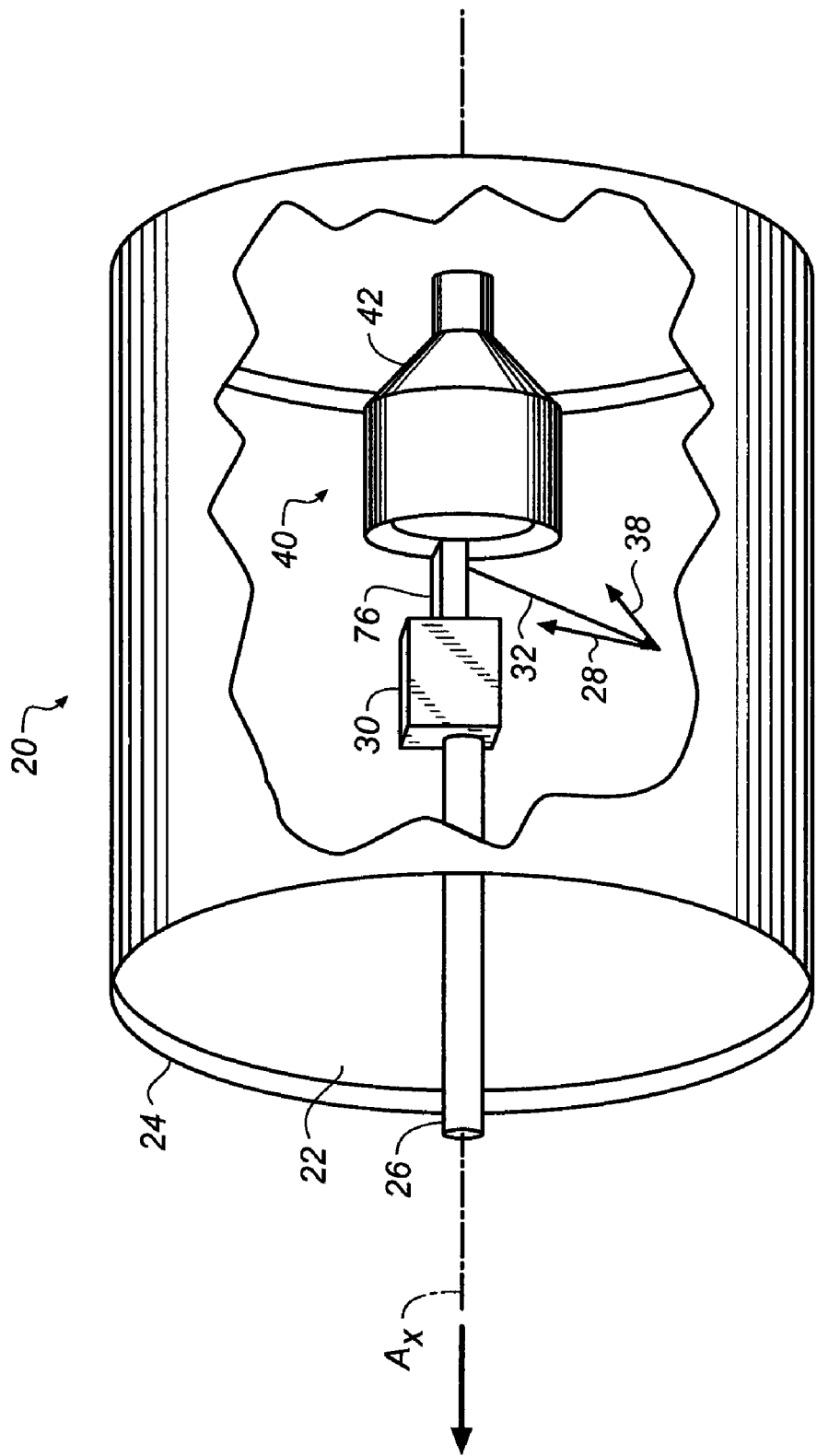
FIG. 1A is a block diagram showing components of an internal drum scanner for scanning a phosphor sheet.

The following is a detailed description of the preferred embodiments of the invention, reference being made to the drawings in which the same reference numerals identify the same elements of structure in each of the several figures.

Figures shown and described herein are provided in order to illustrate key principles of operation according to the present invention. Some exaggeration of relative dimensions and scale may be necessary in order to emphasize basic positional and structural relationships or principles of operation.

In the context of the present disclosure, a shape is substantially rectangular if its sides are orthogonal to one another to within at least 8 degrees. A filter is substantially transmissive to light of a given wavelength if it is considered to be at least 80 percent transmissive to light of that wavelength, preferably at least about 85 percent transmissive or better. An element is substantially opaque to light of a particular wavelength if it is considered to be at least about 65-70 percent opaque to incident light of that wavelength, preferably at least 80 percent opaque or better.

A cylinder is a surface generated by a set of lines parallel to a given line (the generatrix) and passing through a curve in a plane (the directrix). In a right circular cylinder, the generatrix is normal to the plane. References to a cylinder or to a cylindrical shape in the present disclosure are to a right circular cylinder, unless otherwise specifically noted.

The phrase "substantially orthogonal" means at an angle within the range of 90+/−10 degrees of a reference. An angle is considered to be oblique or tilted with respect to a reference if it is not substantially orthogonal to the reference and it is not parallel to within +/−10 degrees of its reference.

In conventional CR scanner systems, the stimulating beam that is directed onto each spot of the phosphor sheet during the scan is of a first relatively long-wavelength and is typically red laser light (generally between about 630-680 nm). The stimulated light from the stimulated phosphor spot is at a second, shorter wavelength, typically in the blue region (generally between about 370 to 430 nm). For the purpose of simplifying description of filters and various treated surfaces in the Specification that follows, the convention of red light for stimulation and blue light for emission is used in the present disclosure. Following this same pattern, a "blue filter", as the term is used in embodiments of the present invention, is considered to be transmissive to the stimulated blue light wavelengths that are emitted and absorptive of stimulating light wavelengths. A "blue mirror", as the term is used in the present disclosure, refers to a reflective surface that reflects light that is in the stimulated blue light wavelengths (nominally ranging below about 450 nm where the phosphor is a blue emitter having the emission characteristics just described, for example) and absorbs light of stimulating scanning beam light wavelengths. Absorption of the scanning beam wavelengths can be effected directly within the reflective surface itself or indirectly, by transmission of the reflected scanning beam through the reflective surface and to an absorptive black surface, for example.

Red and blue designations apply for many known CR scanner systems. However, it should be observed, in the more general case, that the light used to stimulate discharge of energy from the phosphor surface is over a first frequency band and that the light stimulated from the phosphor surface is over a second frequency band and that these first and second frequency bands are distinct from each other and non-overlapping.

FIG. 1A is a schematic diagram showing in a cutaway view some of the basic components and positional relationships of components within a conventional internal drum CR scanner 20. A flexible phosphor sheet 22 is fitted along the inside surface of a drum 24, with concave shape. Drum 24 has the shape of a right circular cylinder and has an axis $A_x$. A beam generator 30 provides a laser beam 32 that is directed by a rotating beam deflector 76 so that it spins radially within drum 24, tracing out a plane with respect to rotating beam deflector 76. As beam 32 is rotated, beam generator 30 components are moved along axis A (in the direction of the arrow shown) by a transport apparatus 26, so that laser beam 32 effectively traces out a helical pattern. A light collector 40 (with light detector 42) travels in the axial direction, along with beam generator 30, and obtains the stimulated light that has been emitted from phosphor sheet 22 by beam 32. Beam generator 30 can have any of a number of conventional designs for embodiments of the present invention and is not shown in subsequent figures.

As shown in FIG. 1A, laser beam 32 from beam generator 30 generates stimulated light 28 that represents the signal for pixel content. The stimulated light 28 is highly Lambertian, that is, has a relatively wide angular spread. There is also a significant reflected portion 38 of laser beam 32 from the phosphor sheet 22 surface. This reflected component can inadvertently strike the phosphor at some location other than that currently being scanned and can thus be the cause of flare.

Transport apparatus 26 can be any of a number of mechanical transport systems for linear transport of beam generator 30 and light collector 40 along the direction of axis $A_x$ or, stated more generally, for obtaining relative movement between these scanning components and phosphor sheet 22 inside drum 24. There are a number of alternative systems and methods for providing this movement, such as leadscrew-driven devices or belt-driven devices for example, well known to those skilled in the scanning arts. For clarity in the description and figures that follow, transport apparatus 26 components are omitted.

As noted in the Background material given earlier, conventional approaches for reducing flare have had limited success and the stray reflected light from laser beam 32 still presents a problem that affects image quality. Embodiments of the present invention address both the problem of flare and the problem of light collection overall for the CR internal drum scanner, with apparatus and methods for improving signal quality when the phosphor sheet is scanned.

Using Opaque and Filter Hoops

Figure 1B:
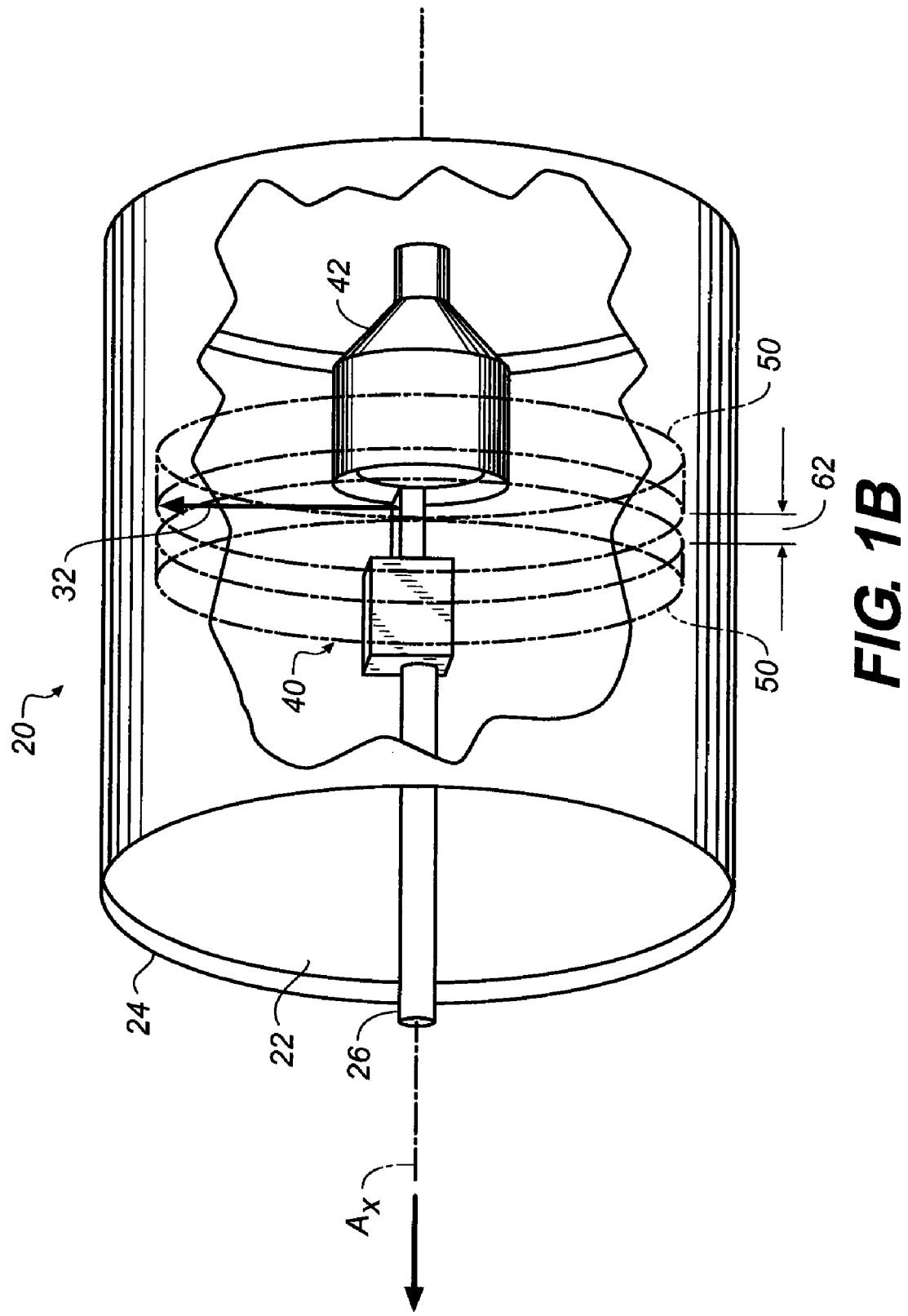
FIG. 1B is a block diagram of the internal drum scanner with the position of opaque or filter hoops shown in phantom.

Referring to FIG. 1B, embodiments of the present invention address the problem of flare and provide improved signal collection by using a pair of cylindrical hoops 50, disposed within drum 24 as shown in phantom outline. Hoops 50 are spaced apart along the axis to define a slot 62 aligned with rotating scanning beam 32 as it scans the phosphor sheet and through which illumination and reflected light are directed. This arrangement can improve the acceptance angles of stimulated light and help to minimize stray reflection of the stimulating beam without requiring modification of other mechanical or optical components of the light collecting system.

Figure 2:
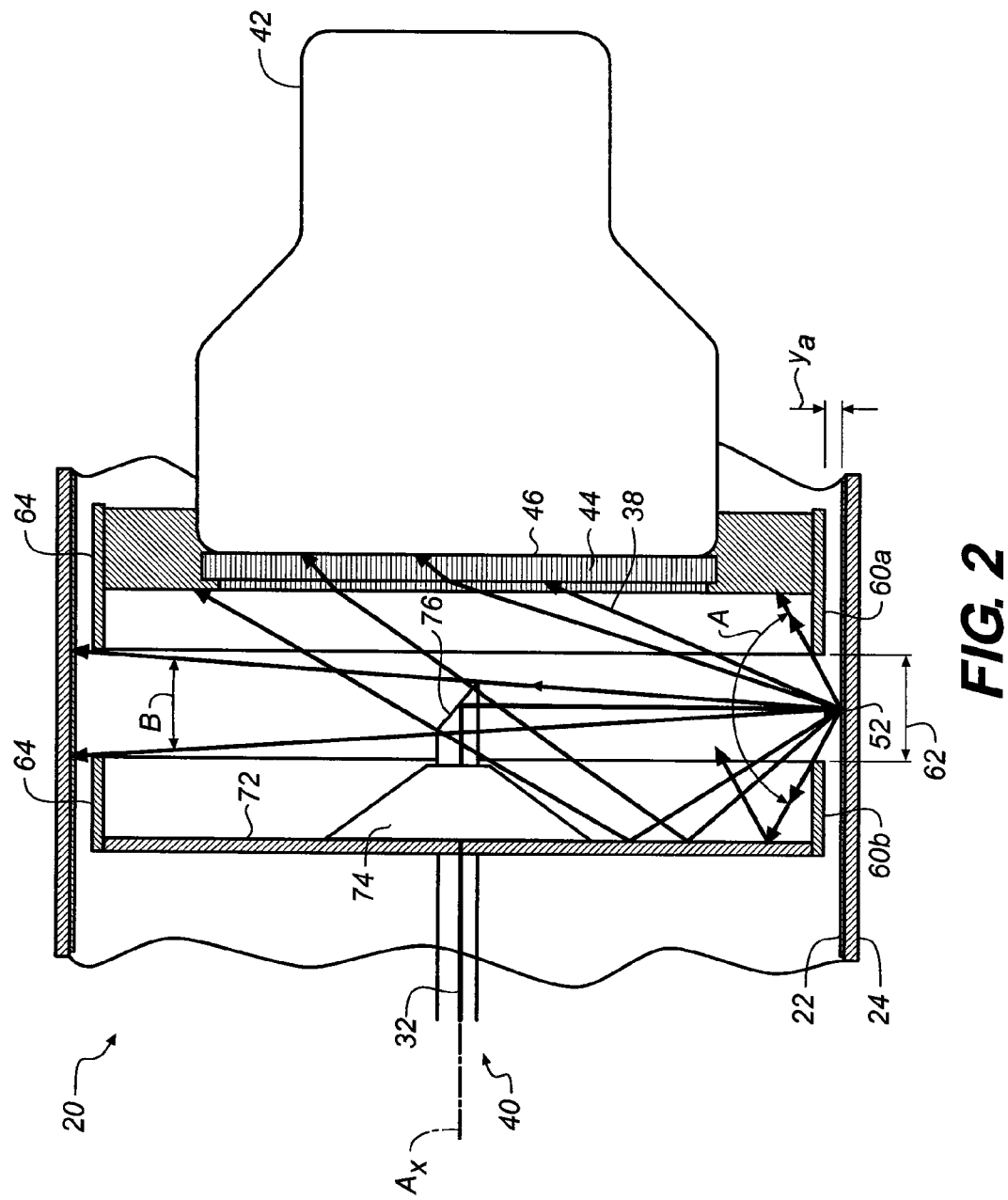
FIG. 2 is a cross-sectional view of an embodiment of the present invention that employs a pair of opaque hoops.

The schematic side view of FIG. 2 shows an arrangement of light collector 40 for internal drum scanner 20 that has a spinning mirror as a beam deflector 76 for radially emitting laser beam 32 and uses a pair of slot-defining opaque hoops 60a and 60b, spaced apart in the axial direction to control the width of a scanning slot 62 and having their radii dimensioned suitably for determining the angle of reflected light. The width of scanning slot 62 and its clearance distance $y_a$ from the phosphor surface determines an acceptance angle "A". An exit angle "B" determines how much reflected red light passes through the collector to reach phosphor on the opposite side and around the periphery of the collector, potentially causing flare. Surfaces at the opposite end of hoop 60b that face light detector 42 are reflective surfaces 72 and 74, configured to provide increased levels of stimulated light for sensing and measurement.

First and second opaque hoops 60a and 60b are circumferentially disposed about the central axis $A_x$ of drum 24 and are spaced apart from each other in the direction of this axis to define slot 62 that is aligned with the rotating scanning beam as it scans the phosphor sheet. The inside surfaces of opaque hoops 60a and 60b are preferably blue reflectors or "blue mirrors" with high reflectivity for stimulated blue wavelengths and red absorbers, with relatively high absorption, above 80% or better, of stimulating red wavelengths. Stimulating beam 32 rotates with reflective beam deflector 76 radially within slot 62 as light collector 40 is translated along the direction of axis $A_x$, providing a helical scan of phosphor sheet 22. A single spot 52 is illuminated at one instant using this scan sequence.

Light detector 42, a PMT in this example, has a high-pass filter 44 that is treated to transmit incident stimulated blue light and to absorb incident stimulating red light. With the design of FIG. 2 and in other embodiments, the inside surfaces of drum 24 optimally reflect blue and absorb red to improve collection and reduce flare. Filter 44 is preferably AR coated on the input face 46 and, to provide optical contact, is cemented to a receptive input face 46 of light detector 42, a PMT in the example shown. This arrangement helps to minimize Fresnel reflection losses of blue and red light reflection. It is advantageous to coat or otherwise treat outside surfaces 64 of hoops 60 to absorb red light in order to minimize red reflection to the phosphor under the hoops. As noted earlier, such reflections could otherwise cause unintended premature discharge of stored energy.

Figure 3:
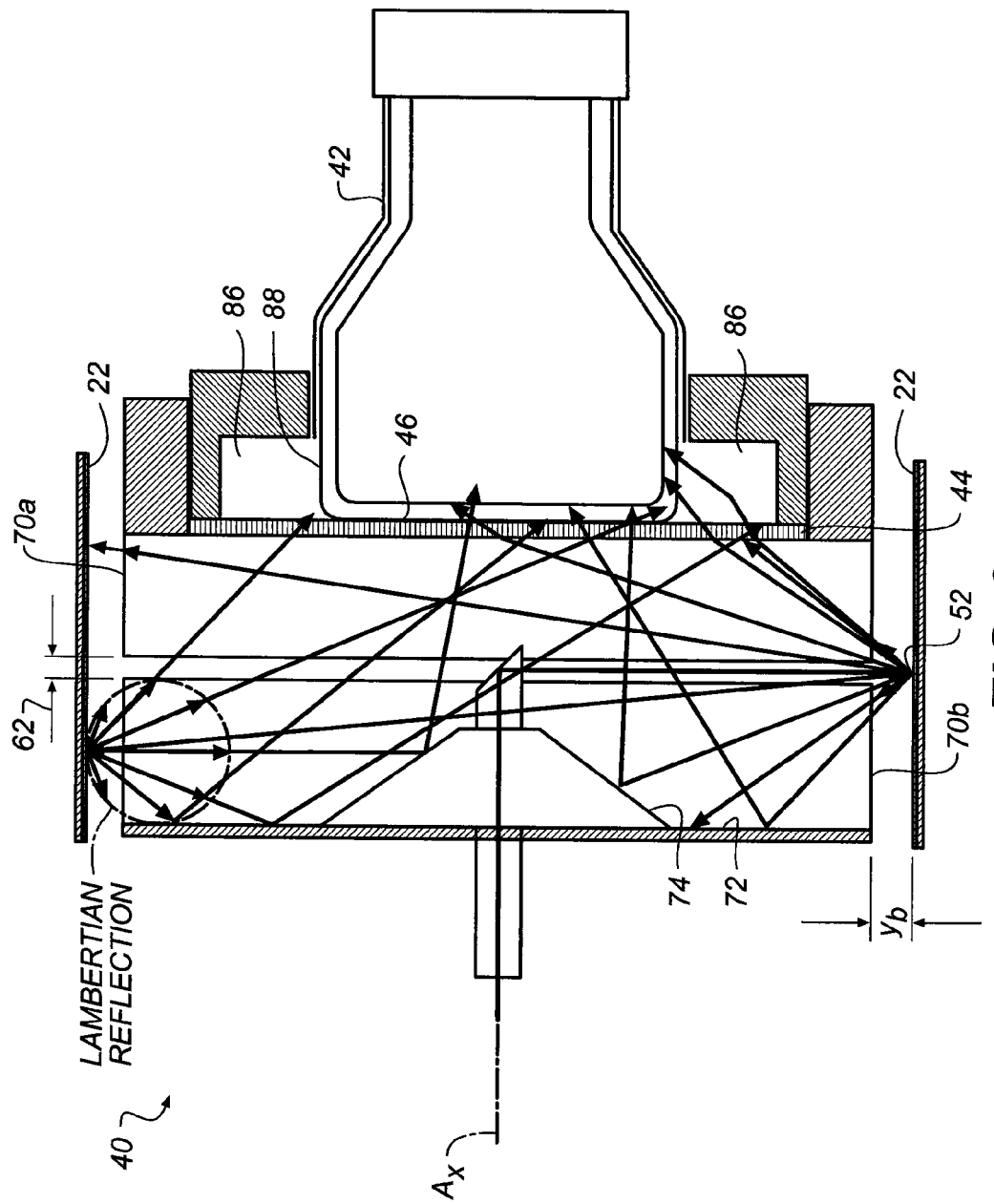
FIG. 3 is a cross-sectional view of an embodiment of the present invention that employs a pair of filter hoops.

The light collector 40 embodiment shown in FIG. 3 provides a number of improvements to the pattern of FIG. 2 by modifying hoop construction. Here, cylindrical filter hoops 70a and 70b are formed from a blue filter material that is highly transmissive to the stimulated blue light and is primarily absorptive to red light wavelengths. The spacing between filter hoops 70a and 70b defines the slot 62 width. This hoop filter arrangement conditions both components of the reflected light appropriately for increasing the signal-to-noise ratio. With this embodiment, slot 62 between filter hoops 70a and 70b can be reduced in width from the opaque-hoop example of FIG. 2. Additionally, height $y_b$ can be increased over the height $y_a$ needed for the opaque hoop arrangement of FIG. 2. This increased clearance is mechanically advantageous and helps to relax some otherwise stringent system tolerances for supporting phosphor sheet 22.

FIG. 3 also shows the Lambertian distribution of reflection from the phosphor surface. The reflective surfaces 72 and 74 attached to filter hoop 70b are disposed to redirect at least a portion (for example, 38) of any of the stimulated, highly angular light content into input face 46. This arrangement enhances detection of stimulated light that is emitted but would not otherwise reach light detector 42.

As with the opaque hoop case of FIG. 2, it is generally advantageous for embodiments that use one or more blue filter hoops 70a and 70b to provide a coating or other treatment that renders the inside surface of drum 24 reflective. This arrangement is particularly useful when the scanned phosphor sheet 22 is of smaller length, so that it does not extend fully around the inside surface of drum 24. In such a case, using a reflective surface helps to maintain consistent levels of efficiency in light collection.

Additional steps can help to compensate for potential imaging problems where media load/unload access slots and retention mechanisms are provided in drum 22. For example, a white tape or other reflective covering may be provided to maintain collection efficiency and uniformity.

Figures 4A, 4B:
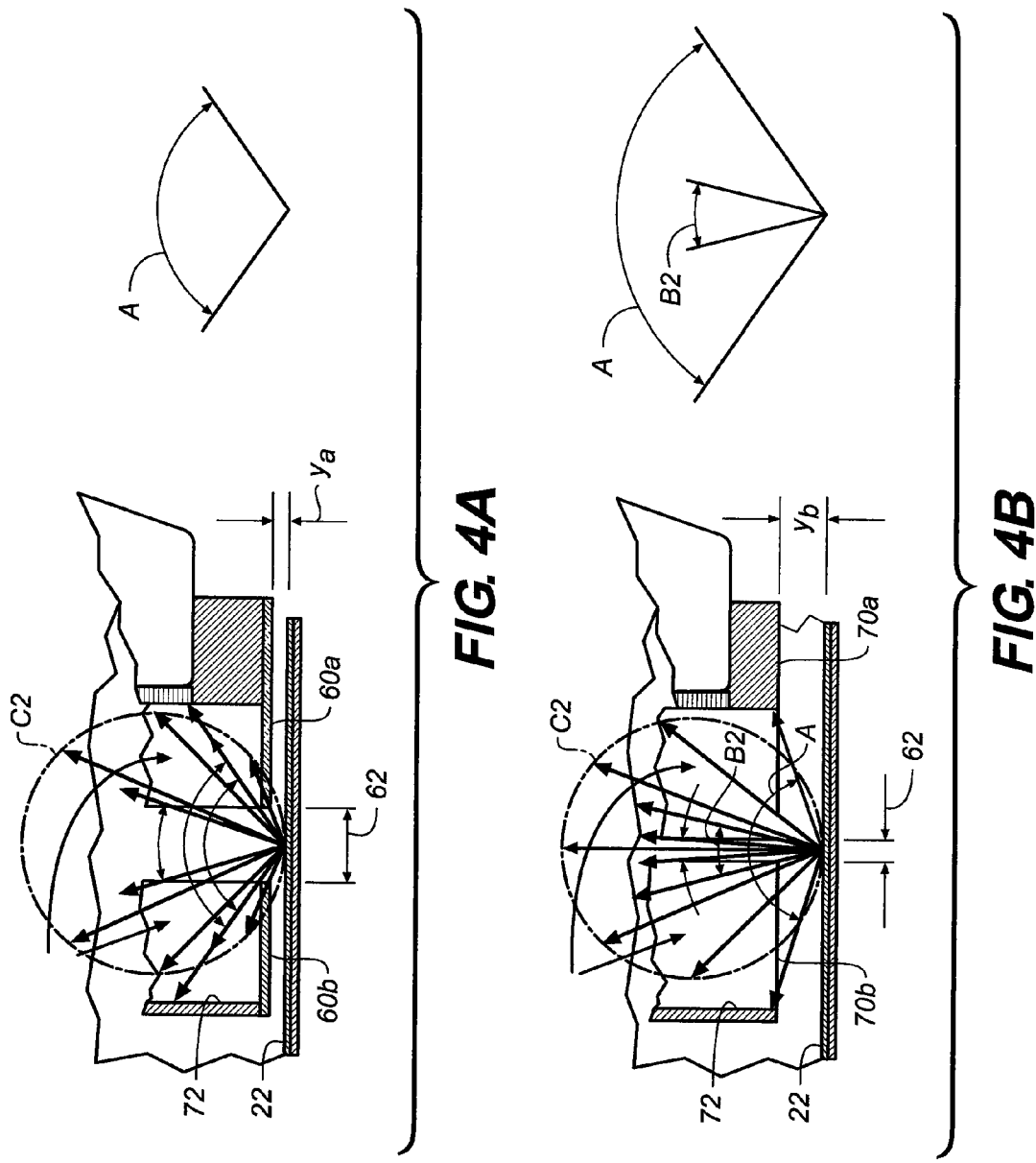
FIG. 4A is a close-up in cross section that shows relative acceptance angles for reflected and stimulated light using opaque hoops.
FIG. 4B is a close-up in cross section that shows relative acceptance angles for reflected and stimulated light using filter hoops.

FIGS. 4A and 4B compare the width of slot 62 and resulting acceptance angles for the embodiments of FIGS. 2 and 3 respectively. In both illustrations, a circle C2 represents the Lambertian distribution of reflected and stimulated light from the phosphor surface. For the opaque hoop system in FIG. 4A, the same acceptance angle A applies for both reflected stimulating red light and stimulated blue light. Thus, the portion of that distribution that enters the collector is the same for both blue and red light. Acceptance angle A is a function of the width of slot 62 and the clearance distance $y_a$ that the hoop edge is above the phosphor surface.

When using the blue filter hoops 70a and 70b of FIG. 3, as shown in FIG. 4B, the acceptance angles for these types of light differ. Here, the acceptance angle B2 for reflected stimulating red light is much smaller acceptance angle A for stimulated light. Thus, a higher percentage of the unwanted red reflection is obstructed with this arrangement. These acceptance angles are again defined by slot 62 and by the height of the slot above the phosphor sheet 22 surface, shown as clearance distance $y_b$. As shown by comparing these two figures, clearance distance $y_b > y_a$. This difference is a decided advantage and proves to be of particular value for added clearance between the hoops 70a and 70b and the surface of phosphor sheet 22 as it is wrapped inside the walls of drum 24. This arrangement facilitates loading and unloading of phosphor sheet 22, for example.

Figure 5:
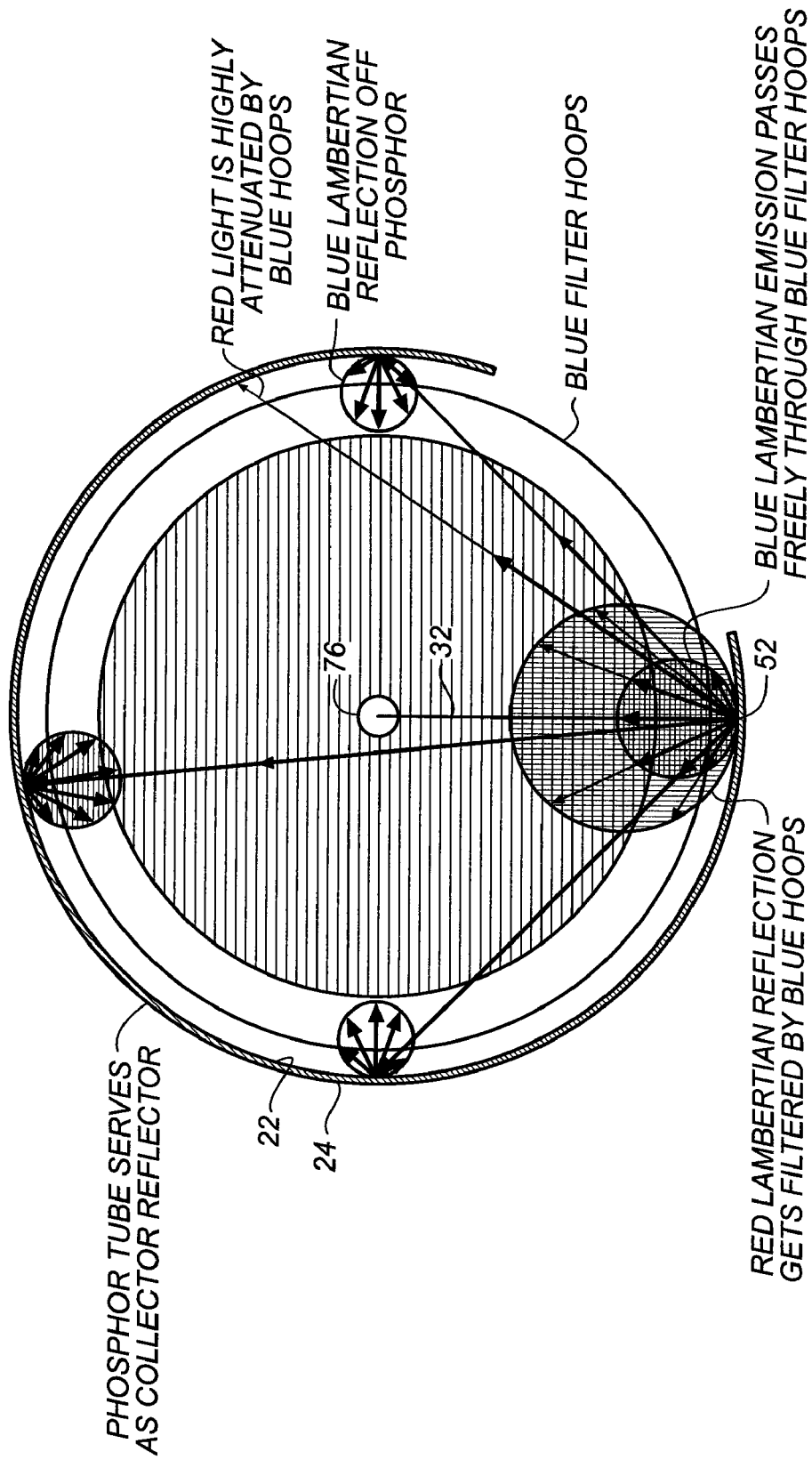
FIG. 5 is a cross-sectional view of an embodiment using filter hoops, taken orthogonally with respect to the optical axis.
Figure 6:
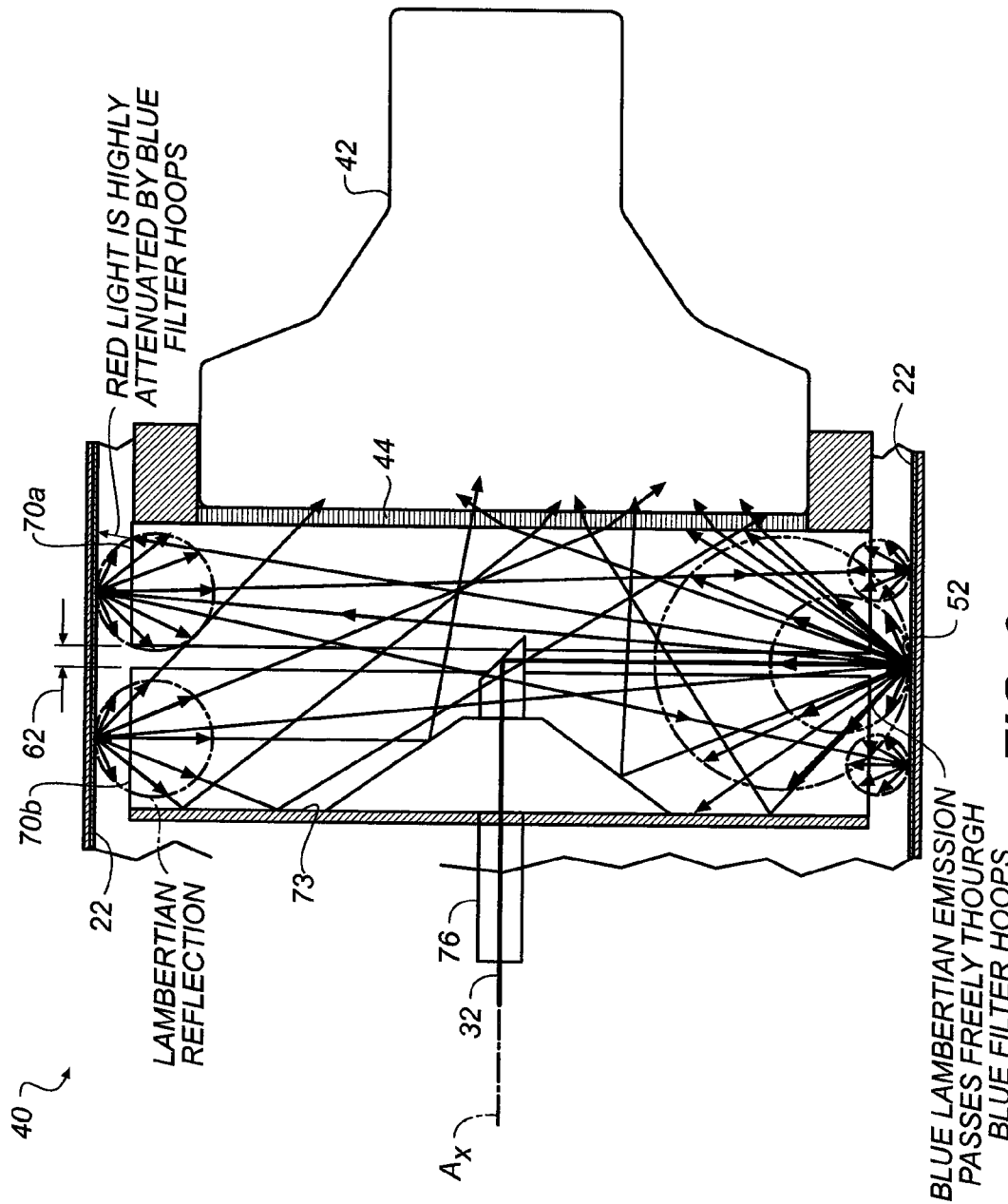
FIG. 6 is a cross-sectional view of an embodiment of the present invention that uses filter hoops.

The embodiment of FIG. 3 also takes particular advantage of the reflectivity of phosphor sheet 22 to incident stimulated blue light. Thus, the blue reflection off the phosphor surface is used to provide a peripheral reflector within the collector chamber. This is shown in more detail in the view of FIG. 5, taken orthogonal to axis $A_x$. Referring to FIGS. 3 and 5, Lambertian reflection from the surface of phosphor sheet 22 has a good chance of being recycled and redirected back toward input face 46 of light detector 42. FIG. 6 shows an embodiment with this light redirection from a side view. A reflective surface 73, substantially orthogonal to the optical axis $A_x$, is coupled to cylindrical hoop 70b. As shown in both FIGS. 5 and 6, the unwanted stimulating red reflected light from spot 52 is highly attenuated by filter hoops 70a and 70b; at the same time, blue stimulated light transmits through filter hoops 70a and 70b.

When using transmissive filter hoops 70a and 70b, at least one of the first and second cylindrical hoops is more than 80% transmissive to light stimulated from the phosphor sheet, preferably with at least about 85 percent transmissive or better. The same cylindrical filter hoop should be less than 35% transmissive to stimulating light from the rotating scanning beam, preferably less than 20% transmissive.

Figure 7:
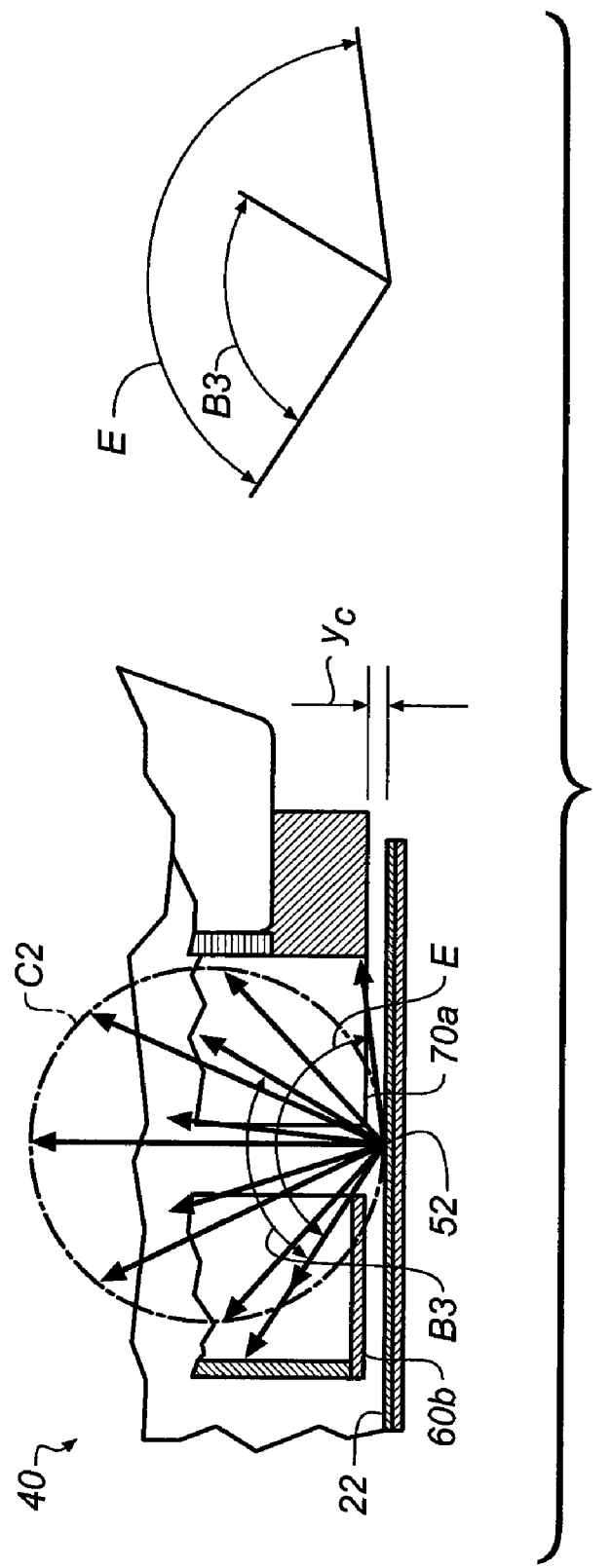
FIG. 7 is a close-up in cross section that shows relative acceptance angles for reflected and stimulated light using paired opaque and filter hoops.

The alternate embodiment of FIG. 7 shows a configuration of light collector 40 that pairs opaque hoop 60b with filter hoop 70a. With this embodiment, acceptance angle B3 for reflected stimulating red light is advantageously smaller than acceptance angle E for stimulated blue light. Clearance distance $y_c$ is improved over that of clearance distance $y_a$ in the FIG. 2 embodiment, but intermediate between that value and the larger clearance distance $y_b$ of the filter hoop embodiment of FIG. 3. Thus, comparing with embodiments shown earlier:

$$y_b > y_c > y_a.$$

Similarly, slot 62 width is also intermediate between that of the wider FIG. 2 and narrower FIG. 3 embodiments.

Beam deflector 76 can be any of a number of types of light-redirecting devices, such as a spinning mirror or rotating prism, for example.

Fabrication of Filter Hoops

Filter hoops 70 exhibit high transmission to stimulated blue light and relatively high absorption of stimulating red light. Preferably, these filter hoops have a red density of about 1.5 to 2. Another requirement is that the hoop filter material must not fluoresce at any wavelength that passes through the PMT blue filter. In addition, the hoop structure must be rugged enough to avoid damage during assembly, use, or servicing. The outer surface of the hoop that faces toward the phosphor sheet should be anti-reflection (AR) coated to avoid red light reflection back to the phosphor near the scanning spot. The inside surface, on the other hand, does not need to be AR coated for red wavelengths, since most red light that might otherwise reach the inner surface has been absorbed in the filter. An inner AR coating for blue wavelengths, however, can help blue light pass through the filter hoop to improve collection. The hoop is preferably non-scattering, although a slight haziness is tolerable as long as there is no appreciable back-scatter to the phosphor.

The cross-sectional views of FIG. 8 show a number of different embodiments for filter hoop 70, labeled 1 through 5. The embodiment labeled 1 is fabricated from a plastic film 54, such as ESTAR polyester film from Eastman Kodak Co., Rochester, N.Y., for example. A blue dye or pigment is coated on the inner (concave) surface. An anti-reflective (AR) coating 56 is provided on the outside (convex) surface of filter hoop 70 with this and other embodiments shown in FIG. 8.

The embodiment labeled 2 employs a glass substrate 58. Glass such as Schott BG25 or BG3 could serve for this purpose. However, to keep unwanted blue absorption levels low, such a filter would be paper thin and could, therefore, prove too fragile for practical application.

The embodiment labeled 3 in FIG. 8 uses a thicker glass substrate 58 as a carrier with the thin filter glass veneer 68 on the inner surface. This could work acceptably well but could be costly to fabricate.

The embodiment labeled 4 in FIG. 8 employs a clear plastic substrate 66. A coating 78 is applied against the inner surface. Coating 78 includes powdered blue filter glass with a binder that matches the index of the filter glass. A 60 micron coating of powdered BG3 glass in a 50% mixture with index matching binder provides the needed filtration in one embodiment.

The embodiment labeled 5 in FIG. 8 uses plastic film 54 that is formulated to provide the needed red light absorption and blue light transmission. An anti-reflective (AR) coating 56 is again provided on the outside (convex) surface of filter hoop 70.

Embodiments of the present invention use an arrangement of cylindrical hoops as part of the light collector that travels along the central axis of the scanning drum and, by doing this, achieve some measure of improvement in signal-to-noise ratio over conventional internal drum scanners. Either or both hoops can be opaque or transparent to the stimulated light.

Embodiments having Improved Peripheral Collection

Further increases in efficiency are possible by improving the peripheral collection capabilities of light collector 40. Referring back to FIG. 2, the conventional PMT is generally fabricated and installed for receiving light from the front, so that only light that reaches its front surface, input face 46, contributes to light detection. Blue filter 44 is optically coupled to input face 46, as described earlier. Because light detector 42 is typically disposed in this way, input face 46, substantially normal with respect to the inner axis $A_x$, is considered to be the primary input surface of light detector 42. When used with this configuration, the outer surface of the PMT generally has a housing or coating that effectively blocks stray light from entering the sides of the detector.

In the embodiment of FIG. 3, however, a peripheral input surface 88 is provided on light detector 42 to allow increased light collection from the side. Peripheral input surface 88 is substantially parallel to the axis $A_x$. To provide this added secondary input surface, the outer surface of the PMT is configured differently from that shown in FIG. 2. The ray-blocking coating or housing of detector 42 is recessed from the plane that is defined by input face 46, exposing more surface area on the sides of the PMT or other detector type. In addition, a peripheral chamber 86 is formed behind input face 46 for providing additional light to the PMT or other detector 42. With this peripheral collection configuration, filter 44 is optically coupled to input face 46, as described earlier, but also extends over a larger area so that it filters light that enters peripheral chamber 86.

The peripheral collection feature that is used in embodiments of the present invention can help to increase the light-gathering efficiency of a single detector 42. However, this feature is even more advantageous when it is combined with embodiments having side-by-side detectors 42 within light collector 40, as described subsequently.

Embodiments having Increased Detector Surface Area

The conventional internal drum scanner detects stimulated light using a single detector component, presenting constraints on sensitivity and signal-to-noise ratio (SNR). Increasing the area of light detector 42 is one option. However, such an approach can be costly, since it can require fabrication of custom sensor devices. Methods and apparatus of the present invention take an alternate approach to the problem in order to provide an arrangement of sensors having expanded surface areas.

FIG. 9A shows a block diagram and FIG. 9B a plan view of light collector 40 in an embodiment that uses two light detectors 42a and 42b. This configuration doubles the aperture of the light detection devices, without requiring redesign of scanner and scanner transport components. To provide improved light collection, tilted flat reflective surfaces 82 and 84, both oblique with respect to the optical axis $A_x$, and both disposed at an oblique angle with respect to the plane of input face 46 of either of light detectors 42a and 42b, are provided for redirecting light into the PMT of light detector 42, through filter 44 at input face 46. Preferably, tilted flat reflective surfaces 82 and 84 are blue mirrors, reflecting the stimulated light in the embodiments shown herein. Stimulated light that is redirected from reflective surfaces 72 and 74, coupled to hoop 70b, can be redirected into detector 42 by cooperation of flat reflective surfaces 72, 74, 82, and 84. FIG. 9B shows a view taken along the axis of the scanner drum, with tilted flat reflective surfaces 82 and 84 on opposite sides of a pair of detectors 42a and 42b, using a dual-detector configuration.

Using a pair of rectangular PMT or other detectors 42 (42a and 42b, as shown in FIGS. 9A and 9B) and subsequently, allows ease of configuration of the tilted mirrors configuration of reflective surfaces 82 and 84. Embodiments using multiple detectors 42 in order to provide a given detection area also allow shorter PMT tubes to be used, thus allowing a collector design that is more compact in the translation direction. As a result, overall scanner size can be reduced.

The circular scanning process of the internal drum scanner can result in a weaker signal and this type of scanner can be more sensitive to noise than line scanners that operate on a flat substrate. For internal drum scanner applications, it is generally desirable to obtain as much of the stimulated light from the phosphor surface as possible. To meet this requirement, embodiments of the present invention combine the use of side-by-side detectors with the improved peripheral collection feature described earlier. The approach shown in the embodiment of FIGS. 10A and 10B improves upon that of FIGS. 9A and 9B by disposing a surrounding reflective surface 80 (shown in FIG. 10A) so that portions of the surrounding surface extend behind the input face 46 of light detector 42, thereby forming a peripheral chamber 86 behind the plane of input face 46 and behind filter 44. Using this peripheral chamber 86 arrangement with at least one reflective surface that extends at least partially behind a plane defined by the input surface of the light detector and that is disposed to direct light toward the input surface of the light detector from the side, light detector 42 is now capable of at least some amount of peripheral light collection in addition to front collection. In this embodiment, filter 44, again glued or otherwise secured against input face 46 to maintain optical contact, itself extends past the diameter of collector 40 and filters not only the light entering input face 46, but also light that, due to its incident angle on a reflective surface within the drum, may be directed to a point that lies behind input face 46 relative to the plane traced out by the rotating scanning beam. The stimulated light that enters peripheral chamber 86 and is incident on reflective surface 80 can then be re-directed into the PMT or other light detector 42.

Figure 10A:
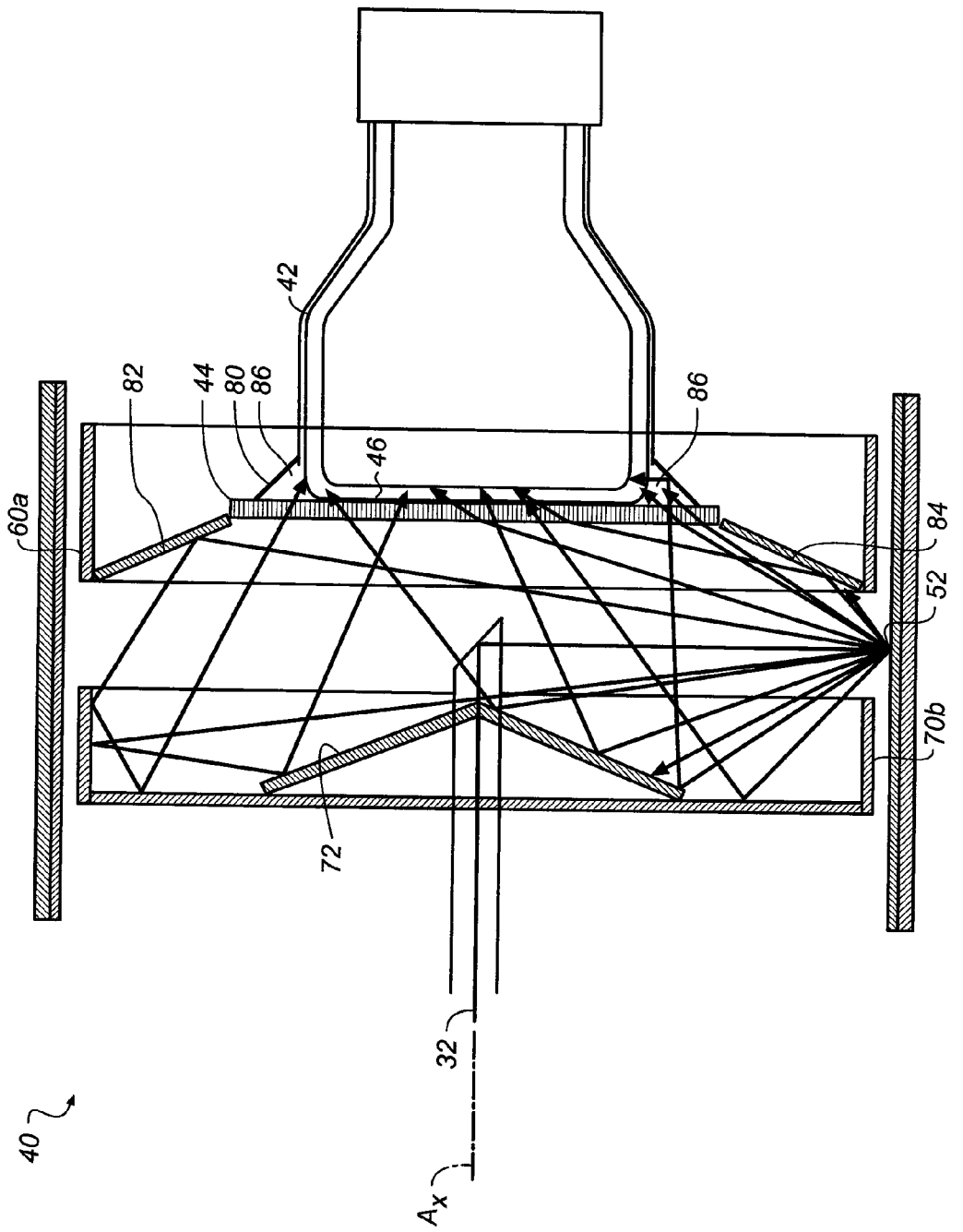
FIG. 10A is a cross-sectional view of an embodiment of the present invention that employs tilted mirrors disposed behind the input face of the light detector for redirecting light into the light detector.
Figure 10B:
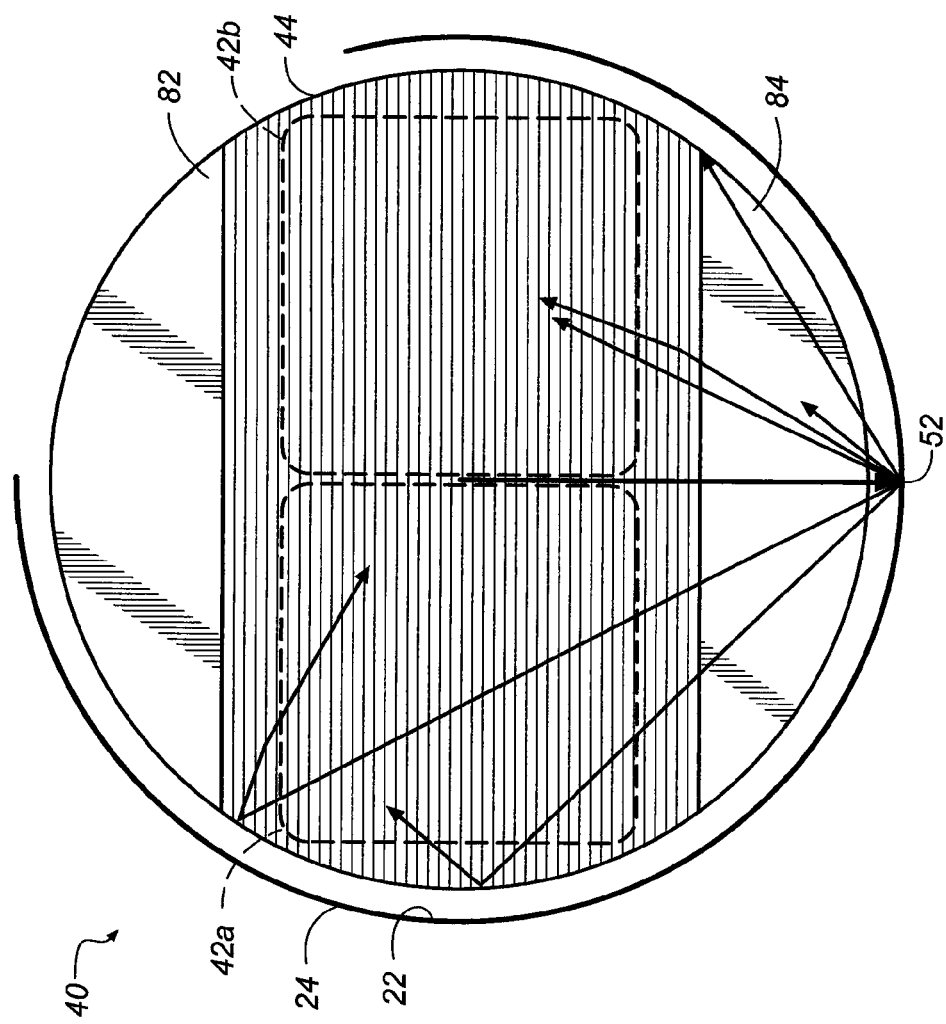
FIG. 10B is a plan view taken along the scanning drum axis and showing the arrangement of detectors and reflective surfaces in the FIG. 10A embodiment.

For the embodiment of FIGS. 10A and 10B, reflectors are also provided to form peripheral chamber 86, with surfaces that extend behind the front surface of the PMT detector, input face 46. With these changes, a higher proportion of light can enter each light detector 42a, 42b from the side of that device. Embodiments of the present invention thus use some of the light that is conventionally considered as unusable or "stray" light to enhance PMT collector efficiency within the scanner. This enhancement is possible, in part, because of the additional filtering that is provided by filter hoops and other components to selectively transmit (or, for blue mirrors, to reflect) the stimulated (blue) light and to reject the stimulating (red) light.

Reflective surface 80 can be formed from a number of different materials, depending upon the desired efficiency and collected wavelength. In one embodiment, reflective surface 80 is formed using a highly specular film such as Vikuiti™ Enhanced Specular Reflector (ESR) film from 3M, St. Paul, Minn. ESR film has favorable reflection characteristics for light in the blue wavelength ranges. A highly reflective diffuse reflector can alternately be used. As used in the embodiments shown herein, reflective surface 80 need not be a blue mirror.

Figure 11A:
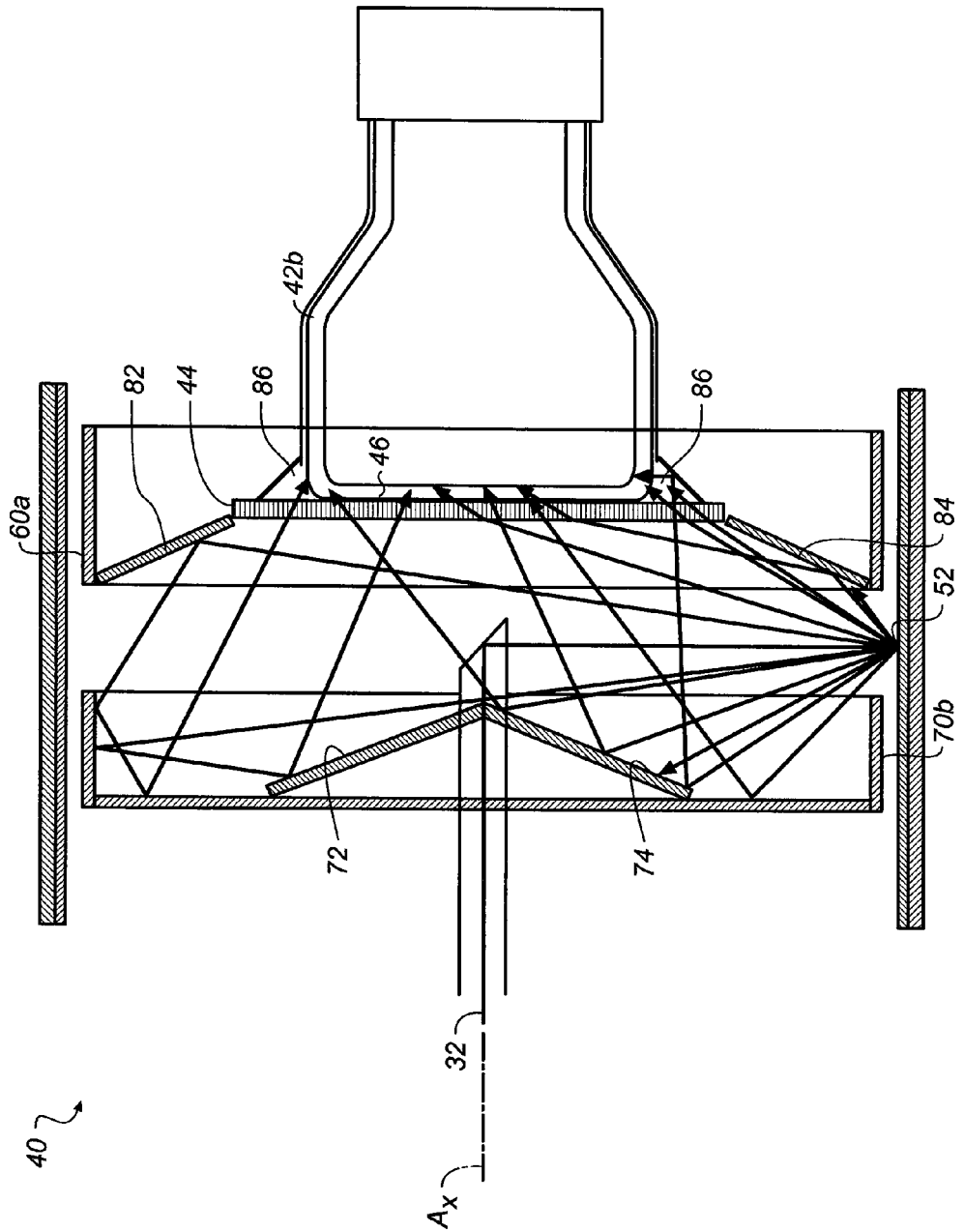
FIG. 11A is a cross-sectional view of an alternate embodiment of the present invention that employs detectors with round input faces and tilted mirrors disposed behind the input face of the light detector for redirecting light into the light detector.

Referring to FIGS. 11A and 11B, alternate embodiment of FIGS. 11A and 11B shows two circular-faced light detectors 42a and 42b, placed side-by-side within the inner chamber of the internal drum scanner. Light detectors 42 (42a and 42b) can be packaged as shown without requiring an increase in the overall diameter of the cylindrical scanning chamber. Planar flat reflective surfaces 82 and 84, tilted or oblique with respect to front face 46 for either detector 42a or 42b, help to provide more uniform efficiency in light collection of the rotating radial scan.

Figure 11C:
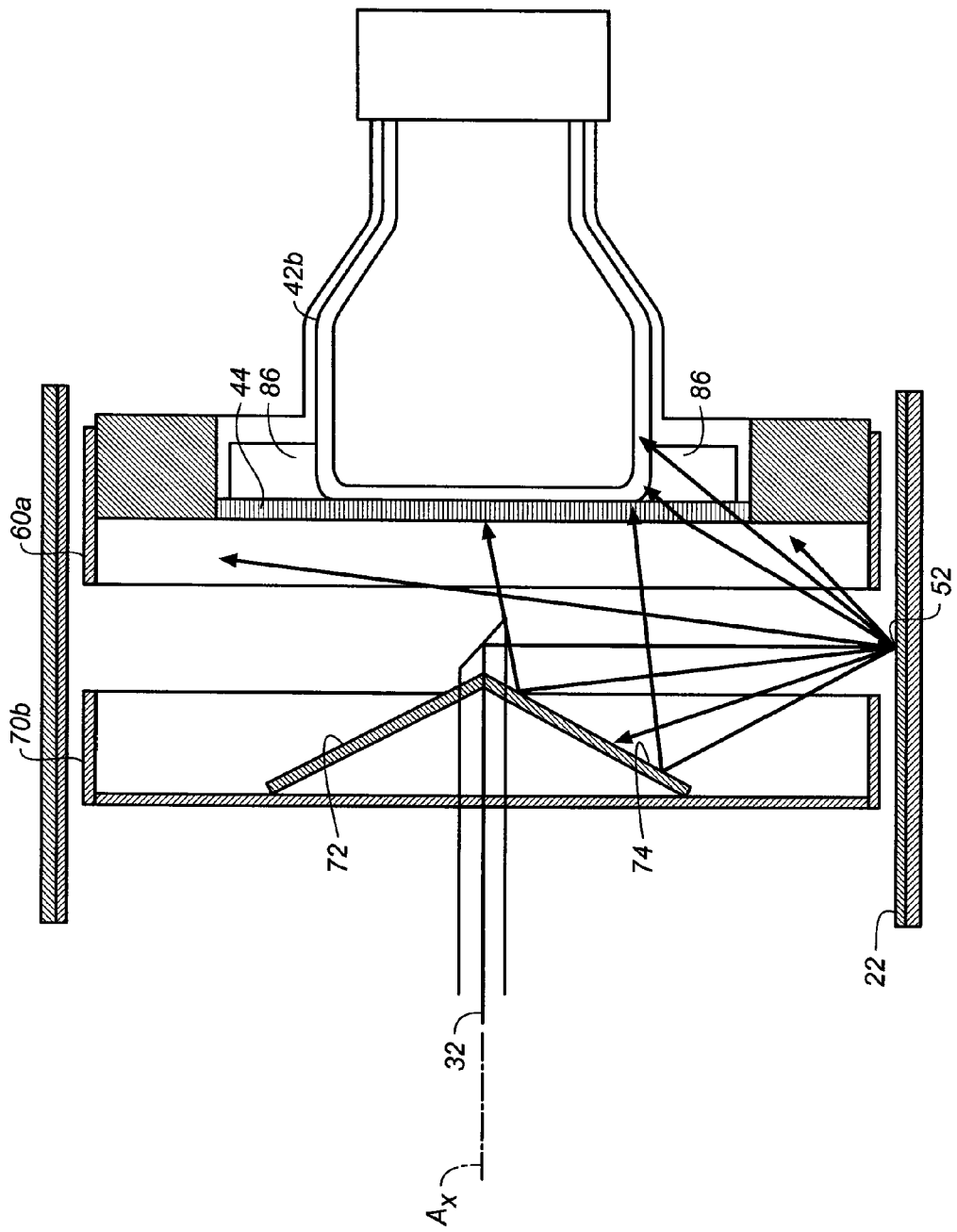
FIG. 11C is a cross-sectional view of an embodiment having a reflective peripheral chamber for light collection.

Referring to the cross-sectional side view of FIG. 11A, an optional white cavity can be formed behind blue filter 44 as a reflective peripheral chamber 86 for providing a measure of reflection to redirect incident light toward light detectors 42a and 42b. FIG. 11C shows an enlarged version of peripheral chamber 86 in another embodiment.

Advantageously, PMT detector devices having circular faces are more readily available than those having other shapes, so that the embodiment shown in FIGS. 11A and 11B can be less costly than alternatives using rectangular or other input face shapes. Additional light-collecting features could also be added to the FIGS. 11A and 11B embodiment, including the use of an surrounding reflective surface 80 as was described earlier with reference to FIG. 10A.

The invention has been described in detail with particular reference to a presently preferred embodiment, but it will be understood that variations and modifications can be effected within the spirit and scope of the invention. For example, while the above description relates to scanning systems that scan using a long-wavelength red laser and read stimulated light of a shorter blue wavelength, other arrangements are possible, including using a phosphor that is scannable with infrared light or using a phosphor material that emits stimulated light of another spectral range. The filtration characteristics of the hoop and PMT filters would in such cases need to be adjusted accordingly, following practices familiar to those skilled in the optical design arts.

The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

20. Scanner
22. Phosphor sheet

24. Drum
26. Transport apparatus
28. Stimulated light
30. Beam generator
32. Laser beam
38. Portion
40. Light collector
42, 42a, 42b. Light detector
44. Filter
46. Face
50. Hoop
52. Spot
54. Film
56. Anti-Reflection coating
58. Glass substrate
60a, 60b. Opaque hoop
62. Slot
64. Outside surface
66. Substrate
68. Veneer
70, 70a, 70b. Hoop filter
72, 73, 74. Reflective surface
76. Beam deflector
78. Coating
80, 82, 84. Reflective surface
86. Peripheral chamber
88. Peripheral input surface
$y_a, y_b, y_c$. Clearance distance
A, E. Acceptance angle
B2, B3. Acceptance angle
C2. Circle
$A_x$. Axis

What is claimed is:

1. A scanning apparatus for obtaining an image from a phosphor sheet comprising:
    a cylindrical drum having an inner axis and having an inner surface that is concave with respect to the axis;
    a light collector coupled to a transport mechanism that is actuable to translate the light collector along a direction parallel to the axis, the light collector comprising:
        a beam generator comprising a light source and a beam deflector that is actuable to provide a rotating scanning beam;
        a filter disposed to block light from said light source; and
        first and second cylindrical hoops circumferentially disposed about the axis and spaced apart from each other along the direction of the axis to define a slot aligned with the rotating scanning beam as it scans the phosphor sheet; and
    at least one light detector behind said filter disposed to detect light stimulated from the phosphor sheet by the scanning beam, where said filter is configured to mount directly in front of the at least one detector and to extend beyond the at least one detector, further comprising a reflective surface mounted behind the filter at a position of the filter that extends beyond the input face of the at least one light detector.

2. The apparatus of claim 1 wherein at least one of the first and second cylindrical hoops is more than 80% transmissive to light stimulated from the phosphor sheet and less than 35% transmissive to light from the rotating scanning beam, the at least one light detector disposed to detect second light stimulated from the phosphor sheet by the first stimulated light that multiply passed through the first and second cylindrical hoop filters.

3. The apparatus of claim 1 wherein the at least one light detector is a photomultiplier tube.

4. The apparatus of claim 1 wherein the second cylindrical hoop is coupled to at least one reflective surface, wherein the at least one reflective surface is substantially orthogonal to the axis and redirects incident light toward the light detector, wherein the at least one reflective surface reflects a first wavelength stimulated from the phosphor sheet and absorbs a second wavelength from the reflected scanning beam.

5. The apparatus of claim 4, where the at least one light detector comprises two detectors respectively centered behind the filter.

6. The apparatus of claim 5 further comprising at least one additional reflective surface to extend substantially between said filter and one of the first and second cylindrical hoops.

7. The apparatus of claim 1 wherein at least one of the cylindrical hoops is anti-reflection treated on either or both inside and outside surfaces.

8. The apparatus of claim 1 wherein at least one of the hoops is fabricated on a glass or plastic substrate.

9. The apparatus of claim 1 wherein a surface of at least one of the hoops reflects a first wavelength stimulated from the phosphor sheet and absorbs a second wavelength from the reflected scanning beam.

10. The apparatus of claim 1 wherein at least one of the hoops is substantially opaque.

11. A scanning apparatus for obtaining an image from a phosphor sheet comprising:
    a cylindrical drum having an inner axis and having an inner surface that is concave with respect to the inner axis;
    a light collector coupled to a transport mechanism that is actuable to translate the light collector along a direction parallel to the inner axis, the light collector comprising:
        (1) a beam generator comprising a light source and a rotatable beam deflector that is actuable to provide a rotating scanning beam; and
        (2) first and second cylindrical hoop filters circumferentially disposed about the axis and spaced apart from each other along the direction of the axis to define a slot aligned with the rotating scanning beam as it scans the phosphor sheet, wherein the hoop filters are more than 80% transmissive to light stimulated from the phosphor sheet and less than 35% transmissive to light from the rotating scanning beam; and
    at least one light detector disposed to detect first light stimulated from the phosphor sheet by the scanning beam and second light stimulated from the phosphor sheet by the first stimulated light that multiply passed through the first and second cylindrical hoop filters.

12. A scanning apparatus for obtaining an image from a phosphor sheet comprising:
    a cylindrical drum having an inner axis and having an inner surface that is concave with respect to the axis;
    a light collector coupled to a transport mechanism that is actuable to translate the light collector along a direction parallel to the axis, the light collector comprising:
        (1) a beam generator comprising a light source and a rotatable beam deflector that is actuable to provide a rotating scanning beam; and
        (2) first and second cylindrical hoops circumferentially disposed about the axis and spaced apart from each other along the direction of the axis to define a slot aligned with the rotating scanning beam as it scans the phosphor sheet; and
    first and second light detectors disposed side-by-side to detect light stimulated from the phosphor sheet by the scanning beam.

13. The apparatus of claim 12 further comprising:
a filter disposed to block light from said light source affixed directly to the first and second light detectors, where the filter is larger than the first and second light detectors; and
at least one reflective surface extending behind the filter adjacent to each of the first and second light detectors.

14. The apparatus of claim 12 wherein each of the first and second light detectors has an input face that is substantially rectangular.

15. The apparatus of claim 12 further comprising one or more reflective surfaces disposed peripherally to the input face of the first and second light detectors and wherein at least one of the one or more reflective surfaces is disposed at an oblique angle relative to the input face of the first and second light detectors, wherein the one or more reflective surfaces are substantially absorptive to the wavelength of the rotating scanning beam.

16. The apparatus of claim 12 wherein the at least one light detector is disposed to detect second light stimulated from the phosphor sheet by the first stimulated light that multiply passed through the first and second cylindrical hoop filters.

17. A method for obtaining an image from a phosphor sheet comprising:
disposing the phosphor sheet along an inner surface of a cylindrical drum having an inner axis, wherein the inner surface is concave with respect to the axis;
directing a beam toward a rotatable beam deflector and actuating the rotatable beam deflector to direct a rotating scanning beam onto the surface of the phosphor sheet;
disposing first and second cylindrical hoop filters circumferentially about the axis and spaced apart from each other along the direction of the axis to define a slot aligned with the rotating scanning beam as it scans the phosphor sheet; and
obtaining light stimulated from the phosphor sheet by the scanning beam at more than two light detectors positioned side-by-side and to provide a signal indicative of an image stored on the phosphor sheet.

18. The method of claim 17 wherein disposing first and second cylindrical hoop filters circumferentially about the axis comprises disposing at least one of the first and second cylindrical hoops as an opaque hoop, and wherein obtaining light stimulated from the phosphor sheet by the scanning beam comprises obtaining first light stimulated from the phosphor sheet by the scanning beam at the more than two light detectors and second light stimulated from the phosphor sheet by the first stimulated light that multiply passed through the first and second cylindrical hoop filters to provide the signal indicative of the image stored on the phosphor sheet.

19. A scanning apparatus for obtaining an image from a phosphor sheet comprising:
a cylindrical drum having an inner axis and having an inner surface that is concave with respect to the axis;
a light collector coupled to a transport mechanism that is actuable to translate the light collector along a direction parallel to the axis, the light collector comprising a beam generator comprising a light source and a beam deflector that is actuable to rotate a scanning beam;
at least one light detector disposed to detect light stimulated from the phosphor sheet by the scanning beam, the at least one light detector having a planar primary input surface that is substantially orthogonal to the axis and a peripheral input surface that is substantially parallel to the axis;
a filter disposed to block light from said light source affixed directly to the planar primary input surface, where the filter is larger than the palanar primary input surface; and
at least one reflective surface that extends at least partially behind the filter and is disposed to direct light toward the peripheral input surface of the light detector from the side.

20. The apparatus of claim 19 wherein the at least one light detector is a photomultiplier tube.

21. The apparatus of claim 19 wherein the at least one light detector comprises first and second light detectors positioned side-by-side.

22. The apparatus of claim 21 further comprising first and second cylindrical hoops circumferentially disposed about the axis and spaced apart from each other along the direction of the axis to define a slot aligned with the rotating scanning beam as it scans the phosphor sheet, the first and second light detectors are disposed to detect second light stimulated from the phosphor sheet by the first stimulated light that multiply passed through the first and second cylindrical hoop filters.

23. The apparatus of claim 22 wherein at least one of the first and second cylindrical hoops is more than 80% transmissive to light stimulated from the phosphor sheet and less than 35% transmissive to light from the rotating scanning beam.

24. The apparatus of claim 22 wherein at least one of the cylindrical hoops is substantially opaque.

25. The apparatus of claim 24 wherein the opaque hoop reflects a first wavelength stimulated from the phosphor sheet and absorbs a second wavelength from the reflected scanning beam.

26. The apparatus of claim 19 further comprising at least one planar reflective surface disposed to direct light back toward the at least one light detector and disposed at an oblique angle relative to the input face of the at least one light detector.

27. The apparatus of claim 26 wherein the at least one planar reflective surface reflects stimulated light.

28. The apparatus of claim 22 further comprising a reflective surface that extends behind the filter and directs light into a peripheral surface of the first and second light detectors.

29. A scanning apparatus for obtaining an image from a phosphor sheet comprising:
a cylindrical drum having an inner axis and having an inner surface that is concave with respect to the axis;
a light collector coupled to a transport mechanism that is actuable to translate the light collector along a direction parallel to the axis, the light collector comprising a beam generator comprising a light source and a beam deflector that is actuable to provide a rotating scanning beam;
first and second light detectors, positioned inside the drum and disposed to detect light stimulated from the phosphor sheet by the scanning beam, each light detector having an input face; and
one or more planar reflective surfaces peripheral to the first and second light detectors and disposed at an oblique angle relative to the input face of the first light detector for directing the stimulated light back toward the first or second light detector.

30. The apparatus of claim 29 further comprising:
at least one reflective surface that extends at least partially behind a plane defined by the input face of the light detectors and is disposed to direct light toward the light detectors from the side.

31. The apparatus of claim 29 wherein the one or more planar reflective surfaces reflect a first wavelength stimulated from the phosphor sheet and absorb a second wavelength from the reflected scanning beam.

32. The apparatus of claim 29 further comprising first and second cylindrical hoops circumferentially disposed about the axis and spaced apart from each other along the direction of the axis to define a slot aligned with the rotating scanning beam as it scans the phosphor sheet.

33. The apparatus of claim 32 wherein at least one of the first and second cylindrical hoops is more than 80% transmissive to light stimulated from the phosphor sheet and less than 35% transmissive to light from the rotating scanning beam, the first and second light detectors are disposed to detect second light stimulated from the phosphor sheet by the first stimulated light that multiply passed through the first and second cylindrical hoop filters.

34. The apparatus of claim 29 wherein the light detector is a photomultiplier tube.

35. The apparatus of claim 29 further comprising:
a filter disposed to block light from said light source, where said filter is configured to mount directly in front of the first and second light detectors and to extend beyond the first and second light detectors; and
a reflective surface mounted behind the filter at a position of the filter that extends beyond the input face of the first and second light detector.

36. The apparatus of claim 29 wherein the input faces of the first and second light detectors are round or rectangular.

* * * * *